US009329969B2

(12) United States Patent
Hargrave et al.

(10) Patent No.: US 9,329,969 B2
(45) Date of Patent: May 3, 2016

(54) METHOD AND SYSTEM OF ASSOCIATING A RUNTIME EVENT WITH A COMPONENT

(75) Inventors: Bentley John Hargrave, DeLand, FL (US); Xin Hui Li, Beijing (CN); Ying Li, Beijing (CN); Tian Cheng Liu, Beijing (CN); Jie Qiu, Beijing (CN); Qi Ming Teng, Beijing (CN); William J. Tracey, Round Rock, TX (US); David Alvra Wood, III, Scarsdale, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1119 days.

(21) Appl. No.: 12/211,961

(22) Filed: Sep. 17, 2008

(65) Prior Publication Data

US 2009/0112783 A1    Apr. 30, 2009

(30) Foreign Application Priority Data

Sep. 19, 2007    (CN) .......................... 2007 1 0153452

(51) Int. Cl.
G06F 11/30     (2006.01)
G06F 9/06      (2006.01)
G06F 11/34     (2006.01)
G06F 9/54      (2006.01)
G06F 21/55     (2013.01)
G06F 9/44      (2006.01)
G06F 9/445     (2006.01)

(52) U.S. Cl.
CPC ............ *G06F 11/3447* (2013.01); *G06F 9/542* (2013.01); *G06F 21/55* (2013.01); *G06F 8/20* (2013.01); *G06F 9/06* (2013.01); *G06F 9/445* (2013.01); *G06F 11/30* (2013.01); *G06F 11/3419* (2013.01); *G06F 11/3476* (2013.01); *G06F 2201/86* (2013.01); *G06F 2209/543* (2013.01)

(58) Field of Classification Search
None
See application file for complete search history.

(56) References Cited

U.S. PATENT DOCUMENTS 5,123,017 A *  6/1992  Simpkins et al. ............... 714/26
6,341,359 B1 *  1/2002  Aiken .................. G06F 9/4446
                                                       714/100

(Continued)

FOREIGN PATENT DOCUMENTS

CN         1549969         11/2004

OTHER PUBLICATIONS

Mitchell, Sevitsky, "LeakBot: An Automated and Lightweight Tool for Diagnosing Memory Leaks in Large Java Applications", Proceedings of ECOOP 2003, Object Oriented Programming 17th European Conference, Jul. 2003, pp. 351-377.*

(Continued)

*Primary Examiner* — Kakali Chaki
*Assistant Examiner* — Walter Hanchak
(74) *Attorney, Agent, or Firm* — Cantor Colburn LLP; David Quinn

(57) ABSTRACT

A method and a system of associating a runtime event with a component. The method includes catching the runtime event; catching the context of the current running environment and determining the current component based on said context; and getting the associating policy of current component and determining the responsible component associated with said runtime event based on said associating policy.

20 Claims, 6 Drawing Sheets

(56) References Cited

U.S. PATENT DOCUMENTS

| | | | |
|---|---|---|---|
| 6,557,120 B1* | 4/2003 | Nicholson et al. | 714/38.13 |
| 6,732,168 B1* | 5/2004 | Bearden et al. | 709/223 |
| 6,862,697 B1* | 3/2005 | Moran et al. | 714/43 |
| 6,865,591 B1* | 3/2005 | Garg et al. | 709/201 |
| 7,028,298 B1 | 4/2006 | Foote | |
| 7,349,826 B2* | 3/2008 | Subramanian et al. | 702/185 |
| 8,626,894 B2* | 1/2014 | Chen | H04L 41/0631 709/224 |
| 2002/0073063 A1* | 6/2002 | Faraj | 707/1 |
| 2003/0009507 A1 | 1/2003 | Shum | |
| 2004/0064724 A1* | 4/2004 | Himmel et al. | 713/201 |
| 2004/0153871 A1* | 8/2004 | Pietschker et al. | 714/47 |
| 2006/0288025 A1 | 12/2006 | Kumar | |
| 2007/0016893 A1 | 1/2007 | Branda | |
| 2008/0109796 A1* | 5/2008 | Kosche | G06F 11/3612 717/158 |
| 2008/0148231 A1* | 6/2008 | Weber | 717/120 |

OTHER PUBLICATIONS

Zakinthinos, "On the Composition of Security Properties", University of Toronto, Phd Thesis, 1996, pp. 1-113.*

Back, "Isolation, Resource Management and Sharing in the Kaffeos Java Runtime System", phD Thesis awarded by University of Utah, 2002, pp. 1-175.*

Ligatti, Bauer, Walker, "Edit automata: Enforcement Mechanisms for Run-time Security Policies", Int Journal of Information Security, vol. 4, 2005, pp. 2-16.*

Bauer, Ligatti, Walker, "A Calculus for Composing Security Policies", TR-655-02, princeton.edu, Aug. 2002, pp. 1-54.*

Chapter 6 of McLaughlin, Flanagan, "Java 5.0 Tiger: A Developers's Notebook", O'ReillyMedia, Inc., Sebastopol, CA, 2004, pp. 82-106.*

Bowles, "Enforcing Resource-Aware Policies Using Run-Time Monitoring", phD Thesis from Queen's University, Kingston, Ontario, Canada, Jan. 2004, pp. 1-95.*

Zanikolas, Sakellariou, "A Taxonomy of Grid Monitoring Systems", Future Generation Computer Systems, vol. 21, 2005, pp. 163-188.*

Chun Yuan, Ni Lao, Ji-Rong Wen, Jiwei Li, Zheng Zhang, Yi-Min Wang, Wei-Ying Ma, "Automated Known Problem Diagnosis with Event Traces", EuroSys '06 Proceedings of the 1st ACM SIGOPs/ EuroSys European Conference on Computer, Apr. 21, 2006, pp. 375-388.*

Walter Rudametkin, "Dynamic instrumentation for application management and application analysis in componentbased applications", Masters Thesis published by Université Joseph Fourier—Master 2 Recherche—Systémes et Logiciels, Sep. 6, 2007, pp. 1-67.*

Wallach, Felten, "Understanding Java Stack Inspection", Proceedings of 1998 IEEE Symposium on Security and Privacy (Oakland, California), May 1998. pp. 1-12 Text.*

* cited by examiner

METHOD AND SYSTEM OF ASSOCIATING A RUNTIME EVENT WITH A COMPONENT

FIELD OF THE INVENTION

The present invention relates to the computer field, and more particularly, to a method and a system for associating a runtime event with a component.

BACKGROUND OF THE INVENTION

In a cooperating environment, a complex interdependent relationship exists between components and it difficult to determine the real consumer of resources. During a cooperation process, one component usually consumes resources on behalf of another component. FIG. 1 shows this case of a Rich Client Platform (RCP) in the prior art, the RCP being the core of the Lotus client. RCP is based on the OSGI specification which has the feature of frequent cooperation between different components. In this case, different accounting determinations should be made with different components' roles and runtime context. FIG. 1 shows a typical process flow of an HTTP request. When the "HTTP component" accepts a service request, it will assign the process to "Servlet Components 1-$n$" completely, which will call the "Utility Component" for a functional process. When the "HTTP component" accepts a request from the administrator to configure the related system, it will call the "Configuration Processor Component" for a functional process, which will in turn call the "XML Processor Component" or the "DB Processor Component" according to the different categories of the related configuration. Obviously, the "Utility Component" consumes resources on behalf of the Servlet. But the Servlet is responsible for its own consumption of resources. To analyze the resource consumption in such an environment, the known methods are inadequate.

So, it is necessary to find the real consumer of resources in this environment, which is very significant to make a clear analysis on the use case of resources in a cooperating environment; to make effective performance diagnosis; and, to recognize the primary consuming point. To understand the resource consumption of software components, which will help to make changes necessary to improve component design, runtime processing and security, some efforts related to resource accounting have been made. But they have defects that make them improper to solve the problem mentioned above. The existing methods do not consider the real consumer of resources between cooperating components, while simply focusing on a single component's resource consumption. It is impossible to make a sensible accounting determination in a cooperating environment without consideration of the relationships between components and without reflecting the conditions of components and the runtime environment. Therefore, it is hard to solve the above-mentioned problem based on the present methods.

Currently, two main units for resource accounting are classified: thread and isolate (an encapsulated Java program or application component that shares no status with others). It is difficult to map different kinds of components to these two units. Most component models are independent from thread and an interdependent relationship exists between different components. So a lack of support to the unit of the usual component makes present methods difficult to be used as a foundation.

Further, these methods are dependent on mechanical code instrumenting. They provide the definition of the interface and related implementations and insert them into codes, which is difficult to change under different environments. So, under this case, it is necessary to find a new method to solve the problem of the real consumer of resources and make an effective accounting.

SUMMARY OF THE INVENTION

An object of the present invention is to associate a runtime event with a component. In this way, when some important events occur, the exact context can be caught, such as under what condition and who deletes a document or which component shall be responsible for the system crash. Besides, by associating a runtime event with a component, it can identify which component violates the system's principles and detect which points are susceptible to attack in the system.

Another object of the present invention is to determine the very component which consumes the resources in a system composed of components having complex interdependent relationship there-between.

According to one aspect of the present invention, a method is provided to associate a runtime event with a component, comprising: catching the runtime event; catching the context in the current running environment and determining the current component according to said context; getting the associating policy of the current component and determining the responsible component associated with said runtime event according to said associating policy.

According to another aspect of the present invention, a system is provided to associate a runtime event with a component, comprising: an event monitor for catching the runtime event; a context monitor for catching the context in the current running environment and determining the current component according to said context; and an inference engine, for getting the associating policy of the current component and determining the responsible component associated with said runtime event according to said associating policy.

BRIEF DESCRIPTION ON THE DRAWINGS

The foregoing and further features of the present invention will become more apparent from the detailed explanation on the embodiments described with reference to the accompanying drawings, wherein the same numerals indicate the same or the corresponding parts, in which.

DESCRIPTION OF THE PREFERRED EMBODIMENTS

Figure 1:
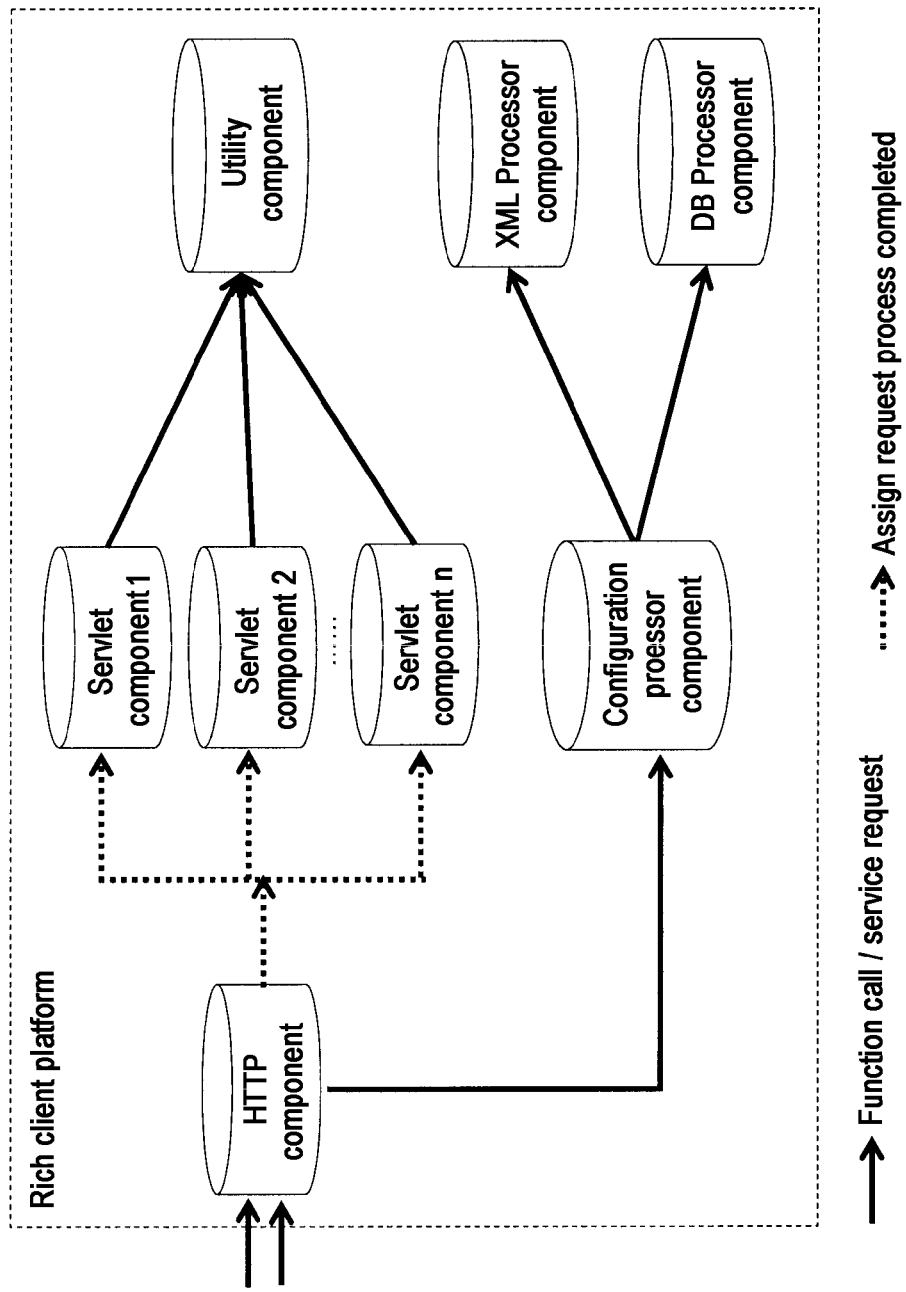
FIG. 1 is a schematic diagram showing that complex interdependent relationships exist between components in a cooperating environment.
Figure 2:
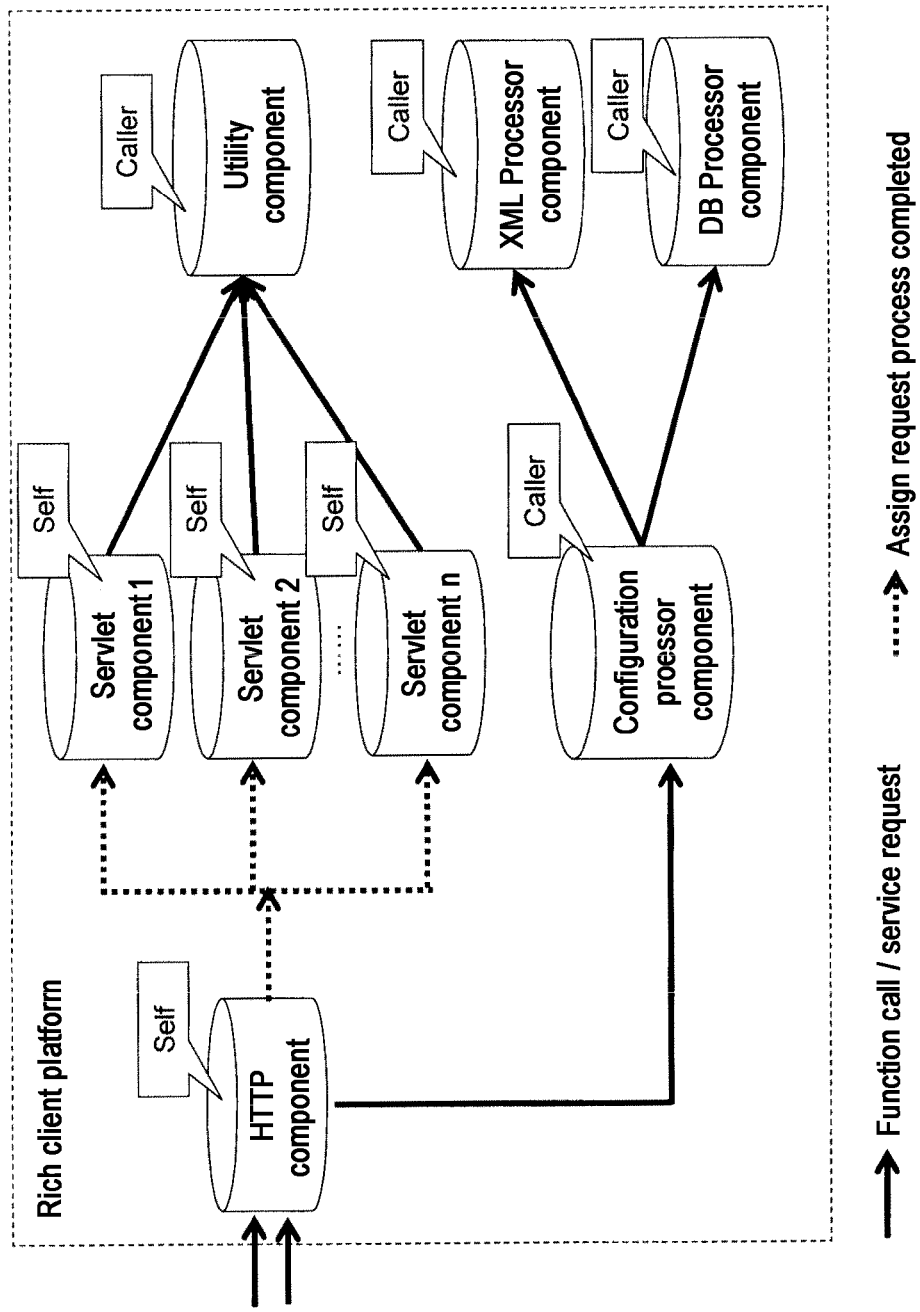
FIG. 2 is a schematic diagram showing attaching policy labels to components according to one embodiment of the present invention.

FIG. 2 is a schematic diagram showing attaching policy labels to components according to one embodiment of the present invention. The components in the RCP of FIG. 2 have the same interdependent relationship as the components in FIG. 1 have. In the present invention, each component is attached with a label indicating the associating policy between a runtime event with said component, i.e., a policy label. Detailed explanation thereof will be done with reference to the specific embodiment hereafter.

Figure 3:
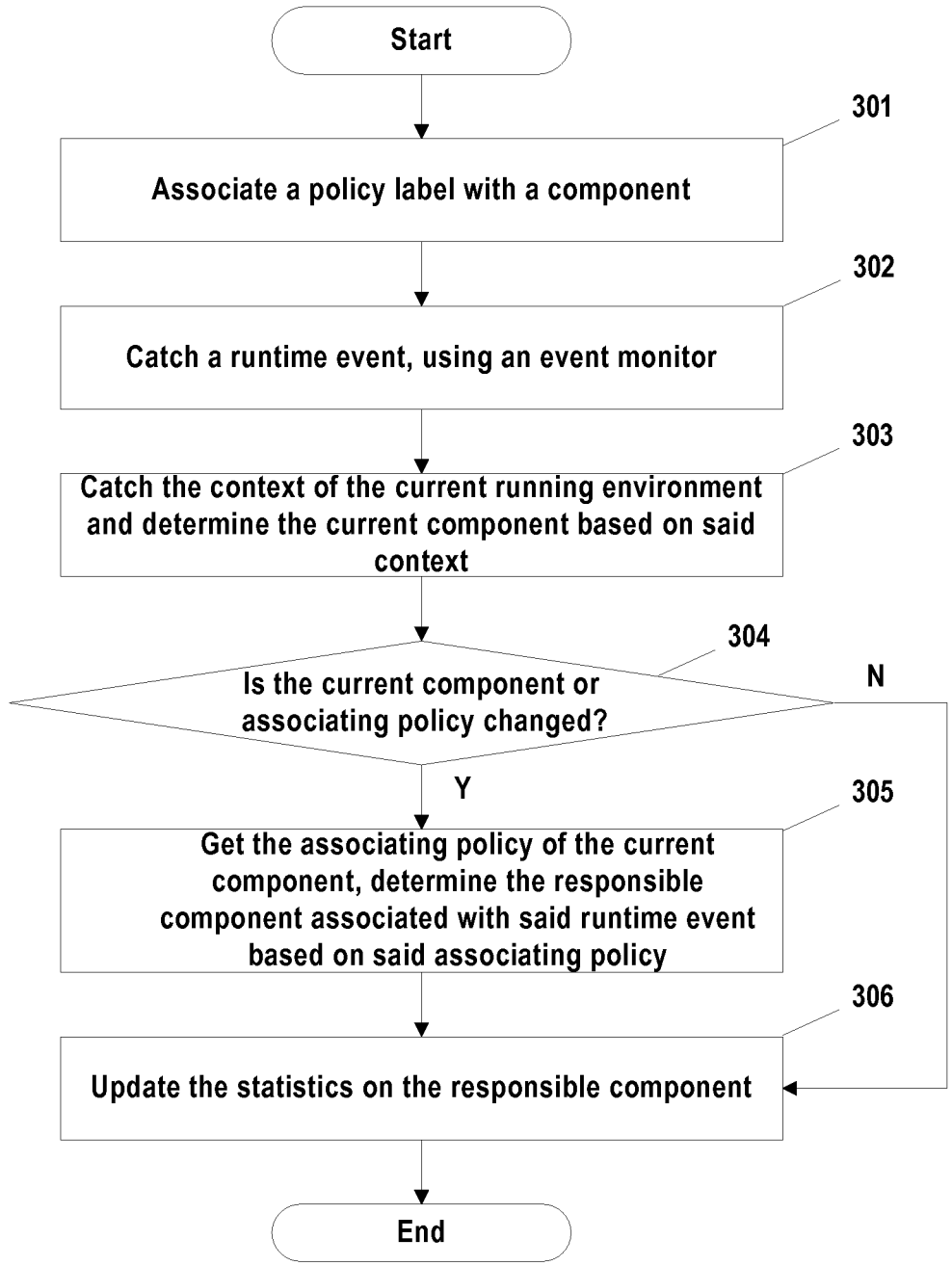
FIG. 3 is a flow chart of a method for associating a runtime event with a component according to one embodiment of the present invention.

FIG. 3 is a flow chart of a method of associating a runtime event with a component according to one embodiment of the present invention. In step 301, a policy label is associated with each component. This step can be implemented in various ways during the design stage.

In Java programming, the associating of a policy label with a component can be implemented through Java annotations. Annotations, a new feature in J2SE 5.0 (Tiger), bring a much-needed metadata facility to the core Java language. Annotations are modifiers to codes and applied to package declarations, type declarations, constructors, methods, fields, parameters and variables. In this way, annotations inserted to the codes can be used as important references to the subsequent accounting process.

Another method to associate a policy label with a component is to employ a policy storage device. For instance, name(s) of one or more components and their corresponding associating policy labels, inter alia, are stored in a separate configuration document. In addition, multiple sets of associating policy label can be prepared for each component for various objectives such as debugging, system security or system test and, during the runtime, one set is selected there among according to the respective object.

Another method to associate a policy label with a component is to provide a dedicated API to each component. When it is necessary to get a component's policy label, said API can be called.

Next, the process to associate a runtime event with a component during the execution stage will be described.

In step 302, the runtime event is caught. The event at least can be caught initiatively by sampling or passively by being triggered by an event. For instance, initiative sampling can be employed to catch CPU time consumption during a time interval. Events like opening file handles or sockets or allocating memory can be caught passively by being triggered by these events.

In step 303, the context of the current running environment is caught and the current component is determined based on said context, wherein the context of the current running environment can be caught by a stack walker catching a stack snapshot and the current component can be determined on the basis of the top stack frame. Alternatively, the current component can be determined by examining the execution log, which records the component calling process during the program execution. When the execution process comes to a new component, information on said component (including the policy label of said component) and the policy are recorded into a log and, when an execution process exits a component, related information is also recorded into the log. In this manner, the execution log can truly reflect the current runtime environment. Therefore, the current component can be determined by examining the execution log. Both the stack snapshot and the execution log can reflect the current running environment and can be used for searching the current component and its associating policy label. The foregoing shows schematically several ways for catching the context of the current running environment. In fact, one skilled in the art can realize the present invention by using various prevailing ways of obtaining the context of the current running environment.

In step 304, which, of the current component or the associating policy, is being changed is determined. If there is no change, it indicates that the current component and associating policy in the runtime stack do not change. Thus, it can be determined that the component responsible for the event is the same as that for the preceding event, (i.e. the analysis result on the preceding event can be utilized directly to get the responsible component). Thus, step 306 can be executed directly to update the statistics on the responsible component. It should be understood that step 304 is an optional step, with an objective to skip other steps to determine the responsible component to improve the efficiency.

If step 304 is determined to be negative, step 305 is executed to catch the associating policy of the current component and determine the responsible component associated with said runtime event, on the basis of said associating policy.

Under the condition that a policy label is attached to a component, the policy label and the component are loaded together to the execution stack. Thus, the stack snapshot contains both the component and the component's policy label. The policy label attached to the current component can be caught from said snapshot. Likewise, when program execution comes to a component, the label therein is extracted and the label and component information are written into the log. In this way, the policy label attached to the current component can be extracted from the log.

In the case that the policy label is stored in a policy storage device, said policy label in the policy storage device can be read. For instance, via the current component name, the policy label corresponding to the component in the policy storage device can be retrieved, or the configuration file corresponding to the current component can be opened so as to read the policy label of the component.

Alternatively, the policy label of the current component can be caught by calling a dedicated API.

The policy label can be one or more of the following: Parent, Self, Caller, Classloader, Common, Allocater, Boundary, Leakbot and HeapAnalyzer. It should be understood that other policy labels can be designed according to different objectives.

The determination of the responsible component associated with said runtime event according to the associating policy can be implemented in the following manner:

When the policy label is Self, the current component is determined as the responsible component;

When the policy label is Parent, the parent component creating the thread is determined as the responsible component;

When the policy label is Caller, the component calling the current component is determined as the responsible component;

When the policy label is Classloader, the system component loading the current component is determined as the responsible component;

When the policy label is Common, the component providing common services is determined as the responsible component;

When the policy label is Allocater, the allocater associated with resources is determined as the responsible component;

When the policy label is Boundary, the top component on the execution stack is determined as the responsible component. In the situation where the execution log is utilized, since the top component on the stack has been recorded into the log during the execution process, it can be recognized from the log as the content last written.

According to the design of associating policy, it is required to keep track of said execution stack when, for example, it is necessary to determine a parent component or the caller of the current component. A parent component or caller of the current component is searched according to the recursion of the track of said execution stack.

In step 306, statistics on the responsible component are updated. When a runtime event and its responsible component are caught, they can be recorded into the log or a statistics pool for future system analysis. It should be understood that step 306 is optional. For instance, it is ok that, when the association between a runtime event and a responsible component is caught during the debugging process, such association relationship is displayed.

When the association of a runtime event with a responsible component is recorded into the log or statistics pool, the runtime context can be reflected. In this way, who deletes a file and under what circumstance, or which component should be responsible for the system crash can be recorded. Further, by associating the runtime event with the component, which component violates the system's rules can be identified and which points in system are susceptible to attack can be detected.

When the association of a runtime event with a responsible component is recorded into the log or statistics pool, which component actually consumes the resources in a system composed of components having complex interdependent relationships there between can be determined, which makes the accounting process more accurate.

There are advantages to associating a runtime event with a component. Firstly, a system composed of components is independently developed and delivered. Each component is autonomous, which means that each component manages its own resources, including the heap space used for performing its functions. Each component charges the allocation of the heap space it needs and frees the heap space when it is not used, which enables the component to be a unit for stack management. Thus, the present invention is quite useful to manage a system composed of third party components. For instance, by attaching policy labels to all of the third party's components, the component responsible for the system's stack error can be identified. In this way, the component with an error can be replaced or the supplier of the component can be required to fix the error.

The method of the present invention is also helpful in hot spot locating. The prior hot spot tracking was conducted only at the level of method. Since the number of methods is rather considerable, the system overhead for hot-spot tracking based on method is large and the primary focus is easily lost. The component in the present invention is of random granularity, which can be a method, a class, a package, even a combination of several packages. Thus, the present invention can be adopted to realize component-based hotspot tracking.

The prior hotspot tracking mainly depended on the running stack of the current thread, such that when a new thread was created, a new stack would be used, with the consequence that the new thread would lose the information related to the parent thread. The loss of the original execution context would bring confusion, even error, to the decision-making. In the present invention, the Parent label is attached to the component, thus the parent thread can be found, enabling more exact hotspot statistics.

In the prior hotspot tracking, initialization of static resources was usually accounted on the first instance activating them. Since the static resources were shared among all the instances of the same class, such an accounting method was unfair. Under the present invention, the Classloader label is used, and the static resources are accounted for on class loader to make the accounting more exact.

Some prior hotspot tracking methods used a threshold value to exclude the object of resource accounting. When the resource consumption of a method was lower than the threshold value, the caller branch of the method would not be tracked any longer, which would result in information loss during the tracking process and analysis error. In the present invention, a Boundary label is attached to a component to indicate the scope of tracking and resource accounting, for instance use of thread pool in the application. As a common programming model, the program is generated during the running process and holds some threads for servicing different requests. The resource consumption of such threads is caused by executing the user's requests, not by itself. The present invention automatically records the resource consumption of such threads on account of the current running component by marking them with a Boundary label, thus solving the problem.

The present method is also helpful in memory leaking spot finding. In the present invention, the leaking spot candidates can be detected by using, for example "Leakbot" or "HeapAnalyzer" label. By annotating the candidate with an Allocater label, the memory allocation and free events can be tracked. After a time period, all objects' allocation and free events, as well as their stacks, are exported. After the memory allocation and free events corresponding to the same object are excluded, the analysis on the remaining events and the corresponding stack can help to find the real reason causing memory leaking.

Figure 4:
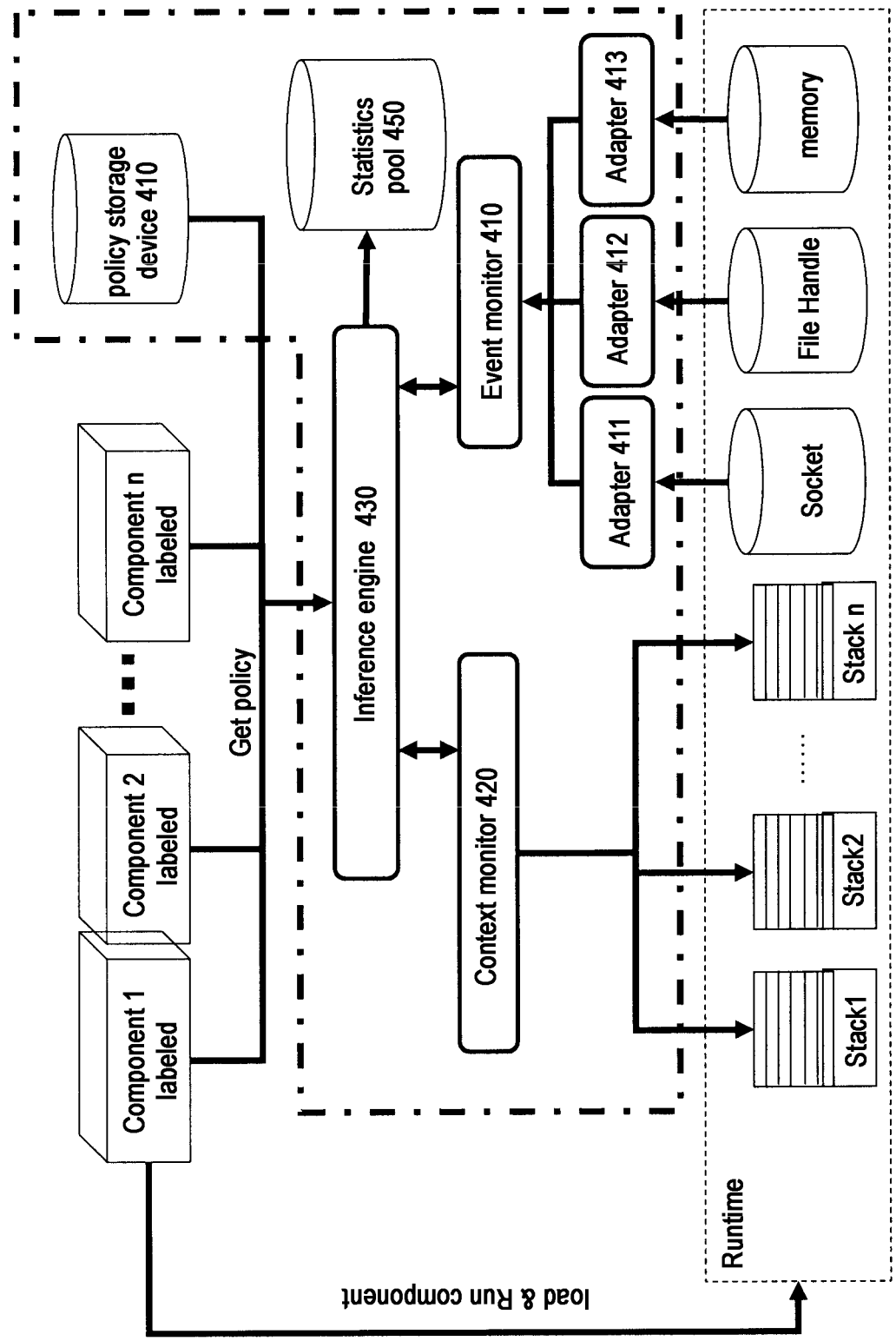
FIG. 4 is a block diagram showing a system for associating a runtime event with a component according to one embodiment of the present invention.

FIG. 4 shows a block diagram of a system for associating a runtime event with a component according to one embodiment of the present invention. Under the present invention, a system associating a runtime event with a component comprises an event monitor 410, a context monitor 420 and an inference engine 430. It can also comprise a policy storage device 440 and a statistics pool 450.

The event monitor 410 is for catching the runtime event, initiatively by sampling or passively by being triggered by the event. For instance, initiative sampling can be utilized to catch CPU time consumption during a time interval. Events like opening file handles or sockets or allocating memory can be caught passively by being triggered by the adapters 411, 412 and 413 of each resource. The realization of adapters 411-413 is related to the types of resources. Adapters 411-413 can be event processors or sampling threads to conduct regular resource sampling.

When the event monitor 410 catches an event, it will notify the inference engine 430. The inference engine 430 notifies the context monitor 420 to catch the context of the current running environment and to determine the current component based on said context. The context monitor 420 can be a stack walker or an execution log reader. The stack walker catches the snapshot of the execution stack, and the execution log reader reads the component calling process recorded during the program execution process. The stack snapshot and execution log are both contexts of the current running environment, and can be used for determining the current component. Further, the context monitor 420 can go through the context. If necessary, context monitor 420 can go through the context recursively to determine the parent component of the current component or the caller of the current component, etc. Upon the context monitor 420 catching the current component, it notifies the inference engine 430. Optionally, the inference engine 430 is equipped with a buffer for storing the component and a policy corresponding to the last event and the responsible component derived from the final analysis. By comparing the component and policy stored in the buffer, the inference engine further judges whether the current component or associating policy has changed; if so, the inference engine determines the responsible component associated with said runtime event; otherwise, the responsible component stored in the buffer is directly used as the analysis result of the event.

The inference engine 430 retrieves the associating policy of the current component and determines the responsible component associated with said runtime event according to said associating policy.

Figure 5:
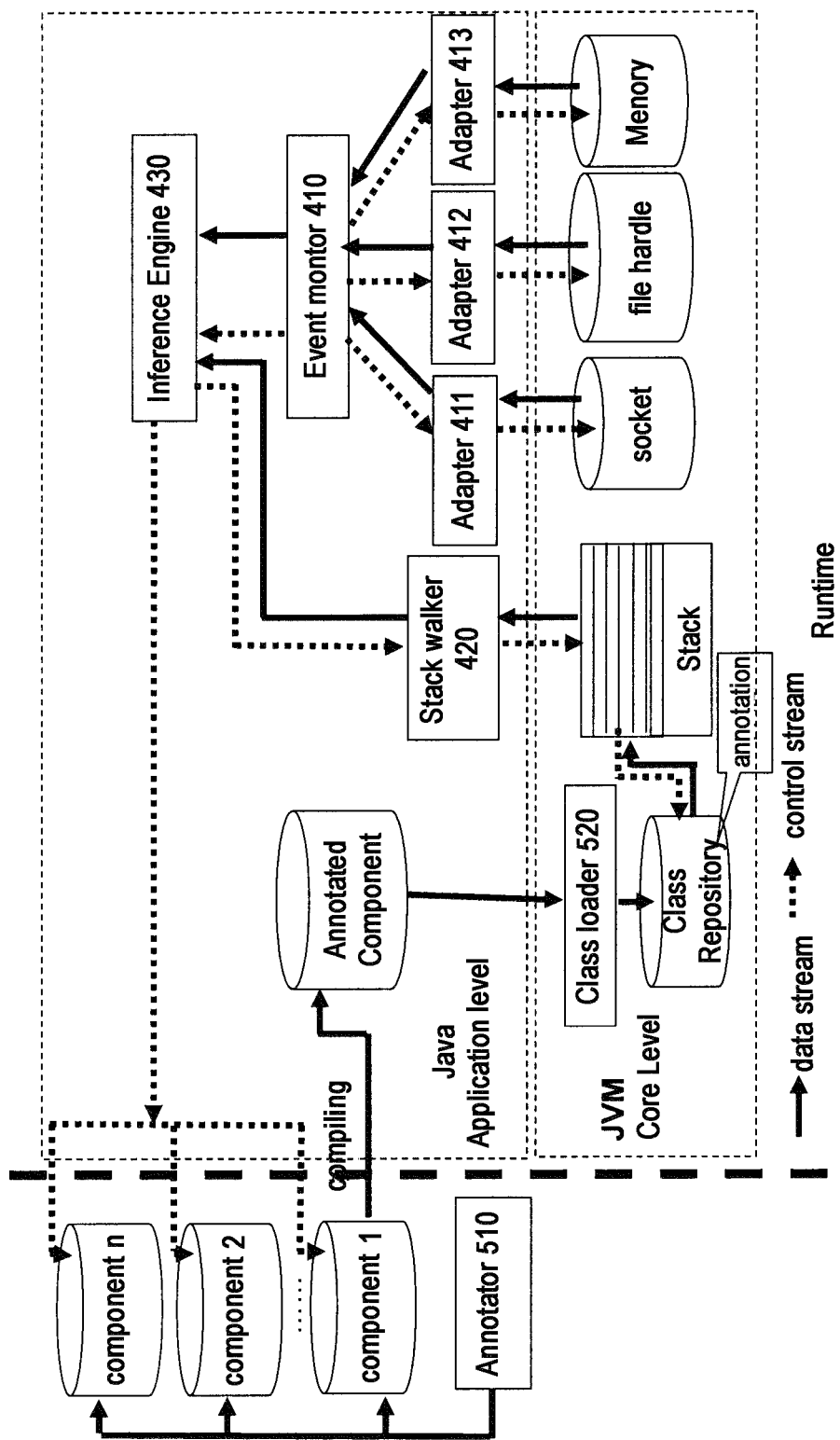
FIG. 5 is a block diagram showing a system for associating a runtime event with a component according to another embodiment of the present invention.

Under the condition that a policy label is attached to a component, the policy label and the component are loaded together into the execution stack. FIG. 5 shows a case to realize the present invention in a Java environment, where an annotator 510 can add the annotation marking the associating policy to the components 1-$n$ during the design stage of the components. Annotated components are loaded into the stacks 1-$n$ by loader 520. Thus, the stack snapshot contains both the component and the component's policy label. The policy label attached to the current component can be caught from the snapshot.

Returning to FIG. 4, the policy label of a component can be stored in a policy storage device 440. In the policy storage device 440, it can be such that each component has its own configuration file or that all policy labels are stored in one configuration file. The inference engine 430 can read the policy label in each configuration file, or retrieve the policy label corresponding to the component in the policy storage device by using the name of the current component.

Alternatively, the inference engine 430 can call a dedicated API to get the policy label of the current component.

If the inference engine 430 needs to determine the parent component or the caller of the current component, it can instruct the context monitor 420 to execute a recursion of context to determine the responsible component associated with said runtime event.

When the inference engine 430 gets the responsible component of the current event, it further updates the statistics for the responsible component in the statistics pool 450.

Figure 6:
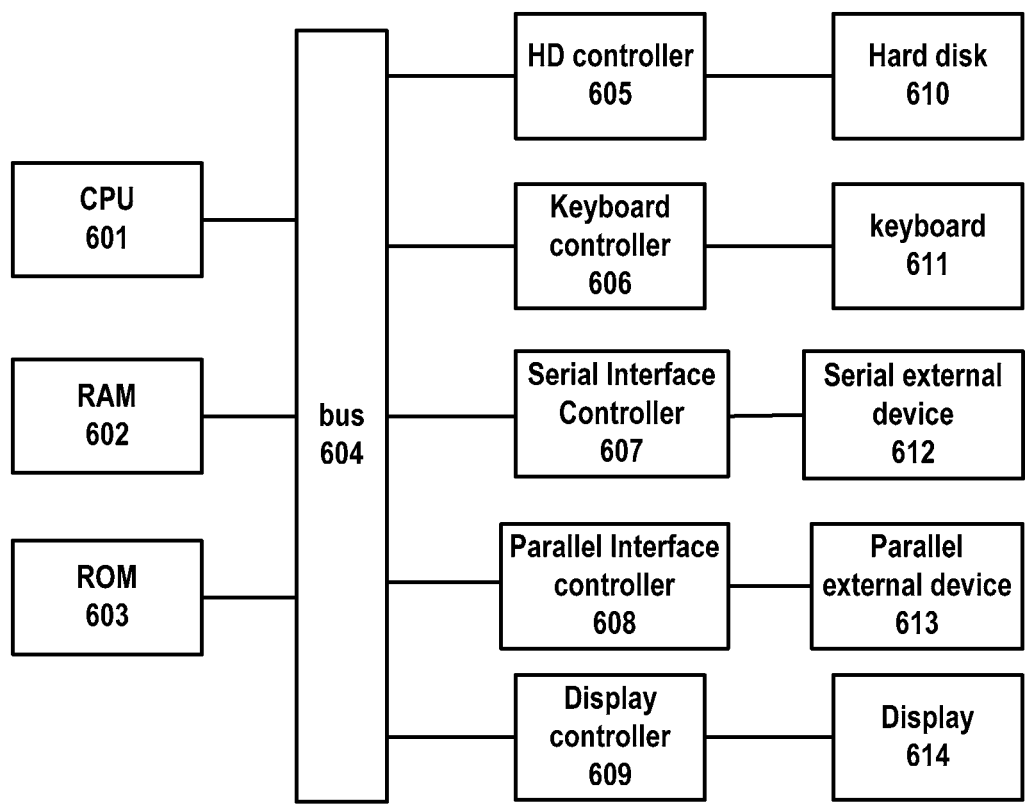
FIG. 6 is a block diagram showing a computer system suitable to implement the present invention.

FIG. 6 is a block diagram showing a computing device capable of implementing an embodiment according to the present invention. The computer system shown in FIG. 6 comprises a CPU 601, a RAM 602, a ROM 603, a bus 604, an HD controller 605, a Keyboard controller 606, a serial interface controller 607, a parallel interface controller 608, a display controller 609, a hard disk 610, a keyboard 611, a serial external device 612, a parallel external device 613 and a display 614. Among these, connected with the bus 604 are the CPU 601, the RAM 602, the ROM 603, the HD controller 605, the keyboard controller 606, the serial interface controller 607, the parallel interface controller 608 and the display controller 609. The hard disk 610 is connected with the HD controller 605; the keyboard 611 is connected with the keyboard controller 606; the serial external device 612 is connected with the serial interface controller 607; the parallel external device 613 is connected with the parallel interface controller 608; and the display 614 is connected with the display controller 609.

The function of each unit in FIG. 6 is well known in the art, and the structure shown in FIG. 6 is also conventional. This structure can not only apply in a personal computer, but also in a portable device, like a Palm PC, PDA, mobile phone, etc. In various applications, for example, when applied to realize a user end containing the client module of the present invention or a server host computer containing the network application server of the present invention, some units can be added to the structure illustrated in FIG. 6, or some units in FIG. 6 can be omitted. The complete system shown in FIG. 6 is controlled by computer readable instructions generally stored as software in hard disk 610, or stored in an EPROM or in other non-volatile memory. The software can also be downloaded from a network (not shown in the figure). It can also be stored in hard disk 610; and the software downloaded from a network can be loaded to RAM 602 and executed by CPU 601 to complete the function determined by software.

Though the computer system described in FIG. 6 can support the scheme for providing network contents for off-line use according to the present invention, said computer system is only an example of a computer system. One skilled in the art can understand that many other computer system designs can also realize the embodiments of the present invention.

The present invention can also be implemented as a computer program product that can be used for example by the computer system shown in FIG. 6, which can contain the codes of a network application server or of a client module for obtaining the network content for off-line use according to the present invention. Before use, the codes can be stored in a memory of another computer system, for example, a hard disk or a removable storage device like a CD or a floppy disk, or downloaded via the Internet or another computer network.

The disclosed method of the present invention can be implemented in hardware, or the combination of software and hardware. The hardware part can be implemented by a special logic; the software part can be stored in a memory and executed by a proper instruction execution system like a microprocessor, a PC or a large computer.

The above embodiments have been explained by taking Java as an example. It should be understood that the present invention is not limited to Java environment. This invention can be applied to any system with components, like Java or PHP environment, etc.

While the embodiments of the present invention considered by far have been referred to for describing this invention, it should be understood that the invention should not be limited to the embodiments disclosed herein. On the contrary, all modifications and equivalent arrangements that fall within the spirit and scope of the appended claims are intended to be embraced.

What is claimed is:

1. A method for determining a computing component responsible for associating a runtime event with a component of a computing system, comprising: assigning an associating policy label to each available component of a computing system, said associating policy label indicating an associating policy associating a runtime event with said component; and the computing system automatically performing runtime steps of: catching a runtime event during execution; identifying a context of a current running environment and determining a current component handling the runtime event based on said context; and obtaining the associating policy of the current component determined to be handling the runtime event, wherein the current component is in a first application and the runtime event is in a second application that is different from the first application; determining a responsible component associated with said runtime event based on said associating policy; and providing an indication of the responsible component for analysis, wherein assigning an associating policy label comprises at least one of: attaching the associating policy label to the available component; storing at least a set of associating policy labels of the available component in a policy storage device; and providing a dedicated API to the available component.

2. The method according to claim 1, wherein steps of identifying a context of a current running environment and determining a current component based on said context include at least one of examining a snapshot of an execution stack and examining the execution log, and wherein said determining the current component is based on said snapshot or said log.

3. The method according to claim 1, further comprising:
performing one of loading the associating policy label and the available component together to the execution stack and recording the associating policy label and the available component into the execution log when the available component is called during execution; and
wherein the step of obtaining an associating policy of the current component further comprises retrieving said attached associating policy label from said context.

4. The method according to claim 1, further comprising:
storing at least a set of associating policy labels of each available component in a policy storage device; and
the step of obtaining an associating policy of the current component further comprises reading said associating policy label from the policy storage device.

5. The method according to claim 1, wherein the step of obtaining an associating policy of the current component further comprises calling a dedicated API to obtain said associating policy.

6. The method according to claim 1, further comprising steps of:
storing a track of said running environment; and
analyzing recursively the context of the current running environment based on the track to determine the responsible component associated with said runtime event.

7. The method according to claim 3 wherein said associating policy label is one or more of the following: Parent, Self, Caller, Classloader, Common, Allocater, and Boundary, and wherein
when the policy label is Self, the current component is determined as the responsible component;
when the policy label is Parent, a parent component creating a thread is determined as the responsible component;
when the policy label is Caller, a caller component calling the current component is determined as the responsible component;
when the policy label is Classloader, a system component loading the current component is determined as the responsible component;
when the policy label is Common, a common service component providing common services is determined as the responsible component;
when the policy label is Allocater, an allocater associated with resources is determined as the responsible component; and
when the policy label is Boundary, a top component on the execution stack is determined as the responsible component.

8. The method according to claim 1, further comprising:
upon the context of the current running environment being identified, determining whether at least one of the current component or the associating policy has changed from that of a preceding event, and if so, determining the responsible component associated with said runtime event.

9. The method according to claim 1, wherein providing an indication comprises at least one of updating statistics on the association of the responsible component with the runtime event in a statistics accounting pool and displaying an association relationship between the runtime event and the responsible component.

10. The method according to claim 1, wherein the runtime event is caught by one of actively sampling and passively being triggered by the event.

11. A non-transitory computer storage medium storing a program of instructions for causing a computer to perform a method for determining a computing component responsible for associating a runtime event with a component of a computing system, the method comprising: assigning an associating policy label to each available 5 component of a computing system, said associating policy label indicating an associating policy associating a runtime event with said component; and the computing system automatically performing runtime steps of: catching a runtime event during execution; identifying a context of a current running environment and determining a current component handling the runtime event based on said context; and obtaining the associating policy of the current component determined to be handling the runtime event, wherein the current component is in a first application and the runtime event is in a second application that is different from the first application; determining a responsible component associated with said runtime event based on said associating policy; and providing an indication of the responsible component for analysis, wherein assigning an associating policy label comprises at least one of: attaching the associating policy label to the available component; storing at least a set of associating policy labels of the available component in a policy storage device; and providing a dedicated API to the available component.

12. The non-transitory computer storage medium according to claim 11, wherein said identifying a context further comprises at least one of catching a snapshot of the execution stack, and updating log information based on a current program execution situation, and wherein said determining the current component is based on one of said snapshot and said log.

13. The non-transitory computer storage medium according to claim 11, further comprising:
loading the associating policy label and the available component together to the execution stack when the available component is called during execution,
wherein the step of obtaining an associating policy of the currently component further comprises retrieving said attached associating policy label from the context of said running environment.

14. The non-transitory computer storage medium according to claim 11, further comprising storing an associating policy label for each available component, wherein the step of obtaining an associating policy of the current component further comprises reading said associating policy label from the policy storage device.

15. The non-transitory computer storage medium according to claim 11, wherein said step of obtaining an associating policy of the current component further comprises reading a dedicated API to obtain said policy.

16. The non-transitory computer storage medium according to claim 11, wherein the method further comprises
storing a track of said running environment; and
recursively analyzing the context of the current running environment based on the track, and determining the responsible component associated with said runtime event.

17. The non-transitory computer storage medium according to claim 13, said associating policy label being one or more policy labels of the following: Parent, Self, Caller, Classloader, Common, Allocater, and Boundary, and wherein:

when the policy label is Self, the inference engine determines the current component as the responsible component;

when the policy label is Parent, the inference engine determines a parent component creating the thread as the responsible component;

when the policy label is Caller, a caller component calling the current component is determined as the responsible component;

when the policy label is Classloader, the inference engine determines a system component loading the current component as the responsible component;

when the policy label is Common, the inference engine determines a common service component providing common services as the responsible component;

when the policy label is Allocater, the inference engine determines an allocater associated with resources as the responsible component;

when the policy label is Boundary, the inference engine determines a top component on the execution stack as the responsible component.

18. The non-transitory computer storage medium according to claim 11, further comprising determining whether the current component or the associating policy has changed from that of a preceding event, and if so, determining the responsible component associated with said runtime event.

19. The non-transitory computer storage medium according to claim 11 wherein providing an indication comprises at least one of updating statistics on the association of the responsible component with the runtime event in a statistics accounting pool and displaying an association relationship between the runtime event and the responsible component.

20. The non-transitory computer storage medium according to claim 11, further comprising catching a runtime event by sampling or by being triggered by the event.

* * * * *